US009540245B1

(12) United States Patent
El-Eskandarany (10) Patent No.: US 9,540,245 B1
(45) Date of Patent: Jan. 10, 2017

(54) METHOD FOR SYSTHESIZING NANODIAMONDS (71) Applicant: KUWAIT INSTITUTE FOR SCIENTIFIC RESEARCH, Safat (KW)

(72) Inventor: Mohamed Sherif Mohamed Mostafa El-Eskandarany, Abraj Al-Oula (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 15/056,958

(22) Filed: Feb. 29, 2016

(51) Int. Cl.
*C01B 31/06* (2006.01)

(52) U.S. Cl.
CPC .................................. *C01B 31/06* (2013.01)

(58) Field of Classification Search
None
See application file for complete search history.

(56) References Cited

FOREIGN PATENT DOCUMENTS

CN 102583361 7/2012

OTHER PUBLICATIONS

Zhang et al. translation (CN 102583361); 2016.*
Lueking et al. (The Effect of HCl and NaOh treatment on Structural Transformations in a Ball-Milled Anthacite After Thermal and Chemical Processing; Carbon; 45, 2297-2306; 2007).*
Boudou et al., "High yield fabrication of fluorescent nanodiamonds, " Nanotechnology, 2009, vol. 20, pp 235602.

* cited by examiner

*Primary Examiner* — Guinever S Gregorio
(74) *Attorney, Agent, or Firm* — Richard C. Litman (57) ABSTRACT

A method for synthesizing nanodiamonds includes high energy ball milling of graphite powder for a period of at least 52 hours at a rotation speed of about 400 rotations per minute to produce nanodiamonds. The ball milling can occur in an inert atmosphere at ambient pressure and room temperature. The nanodiamonds can have a spherical morphology and a particle size distribution ranging from about 1 nanometer to about 10 nanometers.

13 Claims, 6 Drawing Sheets

METHOD FOR SYSTHESIZING NANODIAMONDS

BACKGROUND OF THE INVENTION

1. Field of the Invention

The present invention relates to nanotechnology, and particularly, to a method for synthesizing nanodiamonds from graphite powders by high energy ball milling.

2. Description of the Related Art

Carbon is stabilized in various multi-atomic structures with different molecular configurations called allotropes. Allotropes of carbon include, for example, fullerenes, carbon nanotubes (CNTs), graphene, diamond, and nanodiamonds (NDs). Graphite and diamond are two natural crystalline allotropic forms of carbon. Early studies concerning the fabrication of NDs involved fabrication under extreme high pressure and elevated temperature using detonation technique. When detonation is used, a large amount of non-diamond carbon is also often produced, which severely limits application of the NDs that may be present in the product. In addition to detonation technique, NDs have been successfully synthesized in the last five years by laser ablation, plasma enhanced chemical vapor deposition (PECVD), autoclave synthesis from supercritical fluids, chlorination of carbides and ion irradiation of graphite. Many of the current approaches for fabrication of nanodiamonds require the application of either extremely high pressure or high temperature or both. While the plasma process has resulted in homogeneous nucleation of diamonds at lower pressure and temperatures, the nanodiamonds produced using the plasma process are typically large particles with an average size of 100 nm in diameter. Accordingly, it would be desirable to develop a new cost-effective process for synthesizing large amounts of ultrafine nanodiamonds with narrow nanoparticle size distributions at ambient temperature and atmospheric pressure.

Thus, a process for preparing nanodiamonds solving the aforementioned problems is desired.

SUMMARY OF THE INVENTION

A method for synthesizing nanodiamonds can include providing a graphite powder precursor and a quantity of metal balls inside a container and ball milling the graphite powder inside the container for a first period of time to produce a first product powder including nanodiamonds. The graphite powder in the container can be ball-milled for a period of at least about 52 hours, e.g., about 58 hours to about 65 hours, at a rotation speed greater than 300 rotations per minute to produce a first product powder. The first product powder can then be ball-milled under pressurized conditions, e.g., hydrogen reactive ball milling, for a second period of time to catalyze a non-nanodiamond phase in the first product powder and produce a second product powder. The second period of time can be less than the first period of time.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method for synthesizing nanodiamonds can include providing a graphite powder precursor and a quantity of metal balls inside a container, ball milling the graphite powder inside the container for a first period of time to produce a first product powder including nanodiamonds. For example, the graphite powder in the container can be ball-milled for a period of about 52 hours, e.g., about 58 hours to about 65 hours, at a rotation speed greater than 300 rotations per minute to produce the first product powder. The ball milling can be high-energy ball milling. The ball mill can be operated at helium atmospheric pressure and ambient or room temperature. The milled powders or the first product powder can then be ball-milled under pressurized conditions, e.g., hydrogen reactive ball milling, for a second period of time to produce a second product powder. The second product powder can include nanodiamonds. The second period of time can be less than the first period of time. The second product powder can include a greater quantity of nanodiamonds than the first product powder and/or less carbon onions than the first product powder.

During the first period of time, the graphite powder can be ball milled at a rotation speed of about 400 rotations per minute. A ball to graphite powder weight ratio in the container can be about 40:1. The ball milling of the graphite powder can be high energy ball milling and can be conducted in a conventional planetary-type high-energy ball mill, available commercially. The container for holding the graphite powders can be a vial comprising an alloy of chromium and stainless steel and the metal balls can comprise chromium steel alloy. Typically, the chromium steel alloy balls can include more than one size, ranging from about 10 mm to about 20 mm in diameter. The metal balls can include chromium steel alloy balls having a first size and a second size. The first sized balls can be about 19 mm in diameter and the second sized balls can be about 14 mm in diameter. Preferably, a ratio of the first sized balls to the second sized balls is about 2:1.

The product powder obtained after milling the powder for the first period of time, e.g., about 58 hours of milling, can be disposed in a container and evacuated to the level of $10^{-3}$ bar before introducing $H_2$ gas to fill the vial with a pressure of 50 bar. The high pressure container can then be ball-milled again at a rotation speed of about 400 rotations per minute for a second period of time to produce the second product powder. The second period of time can be shorter than the first period of time. For example, the second period of time can be about 7 hours.

The nanodiamonds produced by the method described herein can have a narrow particle size distribution, e.g., 3 nm to 5 nm, and a spherical morphology. The nanodiamonds disclosed herein can be from about 1 nm to about 10 nm in diameter, e.g., 2 nm to 7 nm, or 3 nm to 5 nm.

Ball milling, as used herein, refers to rotation of a hollow cylindrical shell or vial, partially filled with balls to mill or grind a powder mixture disposed in the shell. The shell can be rotated using an attritor, planetary mill or a horizontal ball mill. Ball milling works on the principle of impact and attrition. Size reduction of the powder is achieved by impact as the balls impact the powder mixture during rotation. Thus, the grinding media is the balls, which may be made of steel such as chrome steel. High energy ball milling is a ball milling process where a powder mixture placed in the ball mill is subjected to high-energy collision with the balls using an attritor, planetary mill or a horizontal ball mill during rotation of the vial containing the balls.

The present method can include solid-state high energy ball milling of commercial graphite powders to synthesize ultrafine nanodiamond powder. For the present method, a high-energy ball mill operated under a helium atmospheric pressure at room temperature can be employed for gradual destabilization of the stable graphite phase into metastable nanodiamonds. The nanodiamond synthesis can include the following transformation stages: 1) graphite to SWCNTs; 2) SWCNTs to amorphous carbon; 3) amorphous carbon to carbon onion; and 4) carbon onion to nanodiamonds. These mechanically-induced phase transformations can occur by introducing the required potential energy, generated by the milling media, to the product of each stage to raise its free energy upon increasing the milling time. The present method can provide high quality nanodiamonds for a wide range of applications relating to, for example, potential engineering, chemical, electronics and biomedical applications, such as tribology, drug delivery, bio-imaging and tissue engineering.

Unlike conventional methods for producing nanodiamonds that require extremely high pressures, elevated temperatures, chemicals, and/or pyrometallurgical processes, the present method provides a mechanically induced, solid-state transformation of graphite at room-temperature under normal atmospheric pressure. The present method offers an inexpensive technological process for the production of a large amount of homogeneous, high-purity nanodiamonds. For example, the present method can be scaled up to several hundred kilo grams for mass production of high quality diamonds.

The following examples will further illustrate the high energy ball milling synthetic processes of making the novel nanodiamonds from elemental graphite but are not intended to limit its scope. In the examples which follow, commercial graphite powders were used. The graphite powders included graphite with particle size of about 20 microns in diameter and had 99.99 wt. % purity. The graphite powder was obtained from PubChem Substance ID 24857078, provided by SIGMA Aldrich, USA. Helium gas (He) cylinders having helium gas (He) 99.999% purity was provided by a local gas company in Kuwait. The Hydrogen gas ($H_2$) cylinders (99.9990% purity) were provided by a local gas company in Kuwait. The stainless steel vials were made of Cr-steel alloy with an internal diameter of 10 cm and capacity of 500 ml was provided by Retsch, Germany. 20 Cr-steel alloy balls were used, having a diameter of 19 mm, with 10 Cr-steel alloy balls having 14 mm diameter. The Cr-steel alloy balls were obtained from Retsch, Germany. Planetary-type high-energy ball mill, models PM100 and PM 400 was obtained from Retsch, Germany. Helium gas (He) atmosphere-glove box (UNILAB Pro Glove Box Workstation, was obtained from mBRAUN, Germany. 220 ml volume hardened steel vial was obtained from Evico Inc, Germany. The balls made of hardened steel (11 mm in diameter), were obtained from Evico Inc., Germany.

Example 1

Process of Synthesizing Nanodiamonds

About 30 g of elemental graphite powders was balanced inside a high purity helium (He) gas atmosphere-glove box and then sealed together with 20 chromium (Cr) steel balls having a diameter of about 19 mm, and 10 chromium (Cr)-steel balls having a diameter 14 mm. The ball-to-powder weight ratio was 40:1. The vial was then mounted on a planetary-type high-energy ball mill operated at an ambient temperature with a rotation speed of about 400 rpm. The ball milling times were varied, ranging from 1 h to 60 h, to allow monitoring of the phase transformations that result from milling for different durations. The as-ball milled powders were regularly discharged from the vial completely in the glove box after selected milling times of 1, 6, 10, 20, 23, 28, 37, 42, 48, 58, and 65 hours. A new batch of graphite powders was charged and sealed into the vial for new milling runs. The product samples obtained after different ball milling stages were characterized by different techniques to understand the progress of graphite-nanodiamonds phase transformations. The end-product of the powders obtained after 58 hours was then charged into a high-pressure vial and evacuated to the level of $10^{-3}$ bar before introducing helium gas to fill the vial with a pressure of about 50 bar. Then, the high pressure vial was mounted on the high-energy ball mill (PM400) for 7 hours. This process was necessary to catalyze the non-nanodiamond phase (e.g. buckyballs, $C_{60}$, $C_{70}$) and to ensure the quality of the produced nanodiamonds phase.

The nanodiamonds produced by the above method were characterized by several spectroscopic methods. The average crystal structure of all samples was investigated by means of X-ray diffraction (XRD) with CuKα radiation, using Intelligent X-ray diffraction system, provided by SmartLab-Rigaku, Japan. The local structure of the ball-milled powders was studied using HRTEM/STEM supplied by JEOL-2100F, Japan. For the local compositional analysis of the nanocomposite powders, energy-dispersive X-ray spectroscopy was used (EDS, Oxford Instruments, UK). Raman spectroscopy was used to characterize the chemical composition and structure of the samples obtained after different ball milling times.

Figure 1:
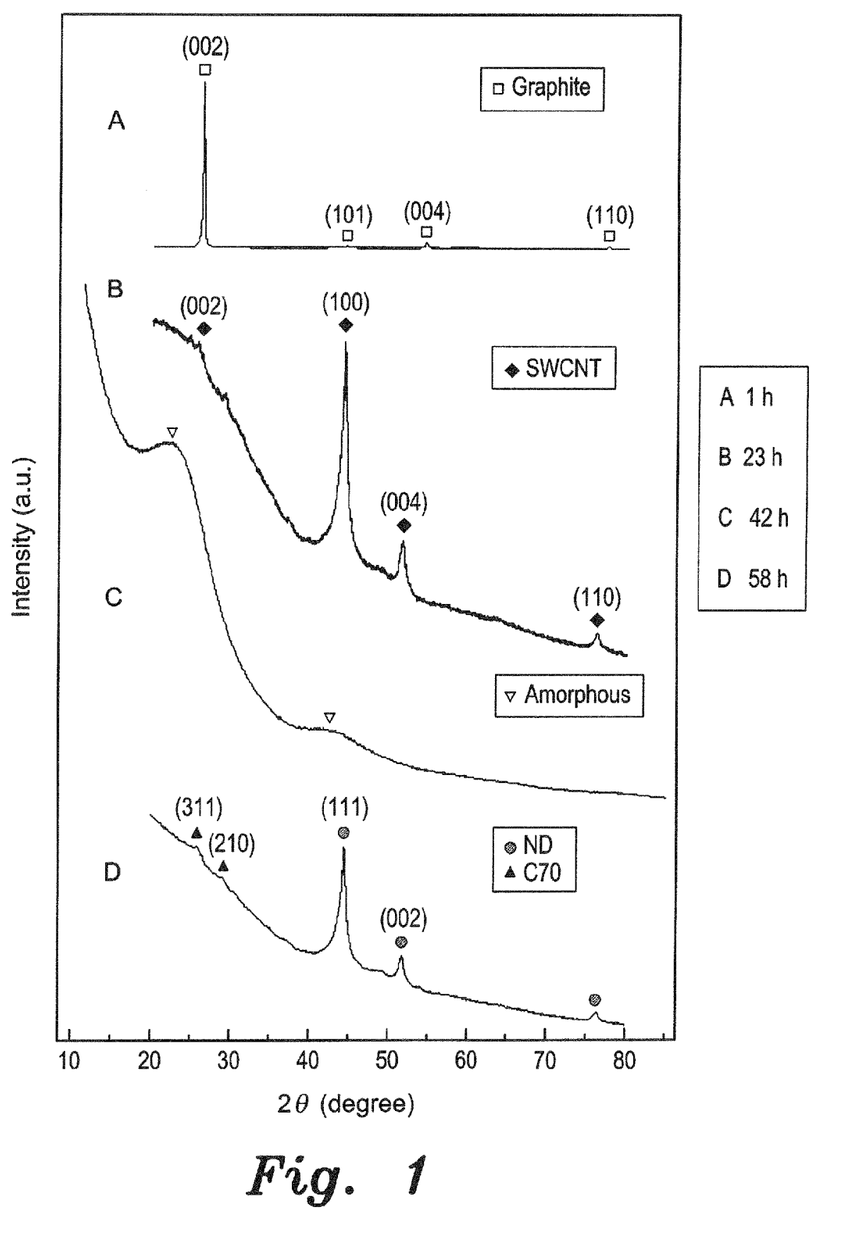
FIG. 1 is a graph showing the representative X-ray diffraction (XRD) patterns of the powders obtained after (A) 1 h, (B) 23 h, (C) 42 h, and (D) 58 h of ball milling time respectively.
Figure 2A:
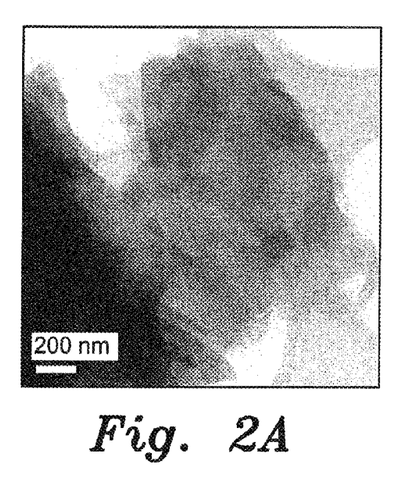
FIG. 2A is a TEM/HRTEM image presenting the internal structure and morphological properties of the graphite powders milled for 1 h.
Figure 2B:
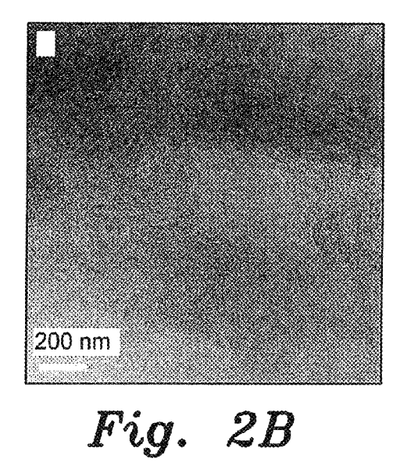
FIG. 2B is a TEM/HRTEM image presenting the internal structure and morphological properties of the graphite powders milled for 23 h.
Figure 2C:
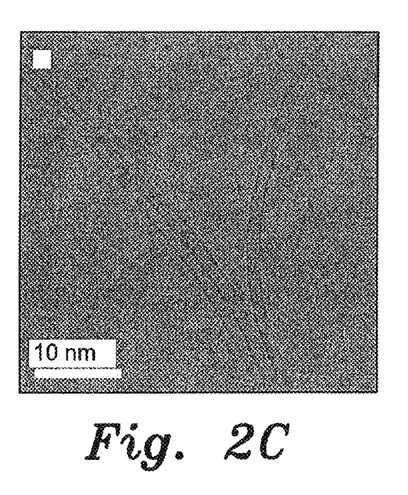
FIG. 2C is a TEM/HRTEM image presenting the internal structure and morphological properties of the graphite powders milled for 23 h.
Figure 2D:
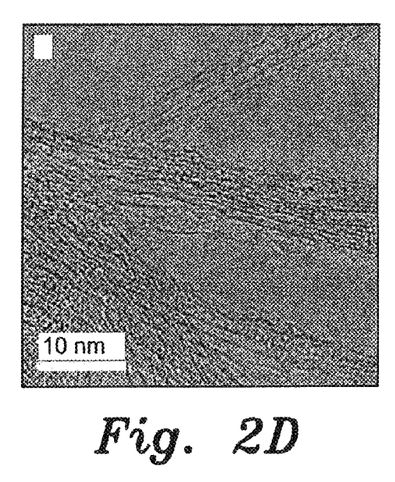
FIG. 2D is a TEM/HRTEM image presenting the internal structure and morphological properties of the graphite powders milled for 27 h.
Figure 3A:
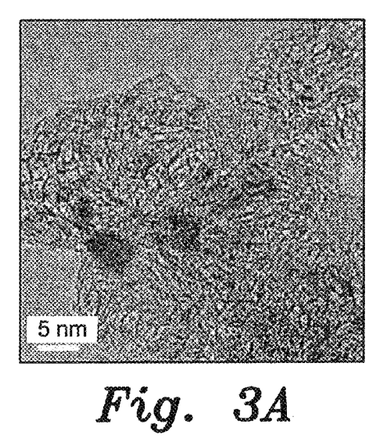
FIG. 3A is a TEM/HRTEM image presenting the internal structure and morphological properties of the graphite powders milled for 32 h.
Figure 3B:
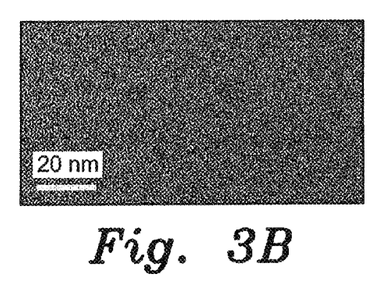
FIG. 3B is a TEM/HRTEM image presenting the internal structure and morphological properties of the graphite powders milled for 42 h.

X-ray diffraction (XRD) patterns and high-resolution transmission electron microscopy (HRTEM) were employed to monitor the phase transformations taking place upon milling of graphite powders for different length of time. FIG. 1, graph A, shows XRD patterns of as-high energy ball milled graphite powders obtained after 1 hour of milling. The powders, including large graphite particles, are indicated by the sharp Bragg peaks of (002), (101), (004) and (110). After this stage of milling, the morphology of graphite powders were flake-like with irregular size of several folded layers, as presented in FIG. 2A. After 23 h of ball milling time (FIG. 1, graph B), the XRD shows almost the same Bragg peaks presented in graph A, however, the HRTEM image of the powder after this stage of milling shows typical structure related to single wall carbon nanotubes (SWCNTs) with diameter ranging between 1-2 nm, as shown in FIGS. 2B and 2C. Further ball milling for 27 h enhanced the mechanical deformation generated by the milling media (Cr-steel balls) resulting in heavy deformation of the SWCNTs to form bundle of raft-like morphology, as displayed in FIG. 2D. After 32 h of milling time, the SWCNTs failed to withstand the impact and shear forces generated by the milling media and disintegrated significantly into short-random fibers and nanograins of irregular shapes and sizes, as shown in FIG. 3A. After 42 hours of milling time (FIG. 1, graph C), all the Bragg peaks related to the SWCNTs suddenly disappeared and completely replaced by halo diffuse peaks, implying a SWCNTs-amorphous carbon phase transformation. The HRTEM image of this sample shows a dense random-packing structure with maze-like morphology (FIG. 3B), suggesting the formation of an amorphous phase. The existence of untransformed nano-carbon fibers and/or SWCNTs are hardly seen, indicating a complete SWCNTs amorphous carbon phase transformation. Moreover, the nano-beam diffraction pattern (NBDP) reveal a halo-diffuse pattern of a typical amorphous phase, as displayed in FIG. 3D.

Figure 3C:
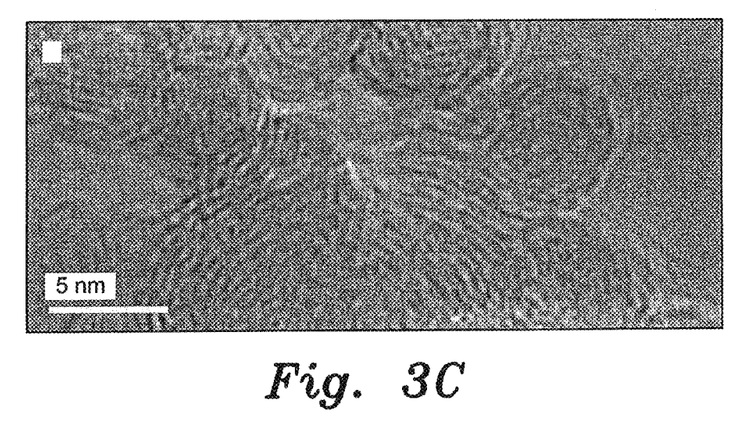
FIG. 3C is a TEM/HRTEM image presenting the internal structure and morphological properties of the graphite powders milled for 48 h.
Figure 3D:
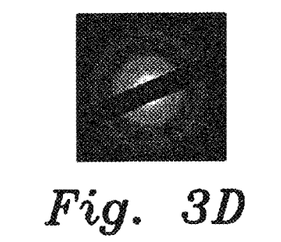
FIG. 3D shows the nano beam diffraction pattern (NBDP) revealing a halo-diffuse pattern of a typical amorphous phase.
Figure 4A:
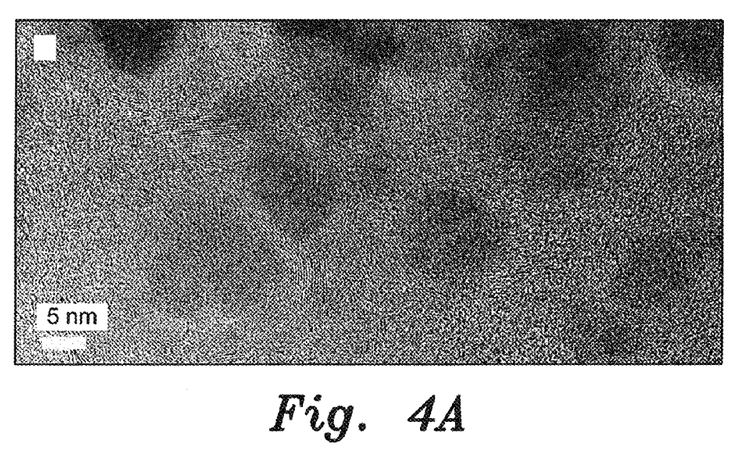
FIGS. 4A-C show the HRTEM image of graphite powders obtained after 52 h of ball milling time. The HRTEM image and the corresponding nano-beam diffraction pattern (NBDP) of a single nanodiamond particle laid in the core of carbon-onion structure are presented in (B) and (C), respectively.
Figure 4B:
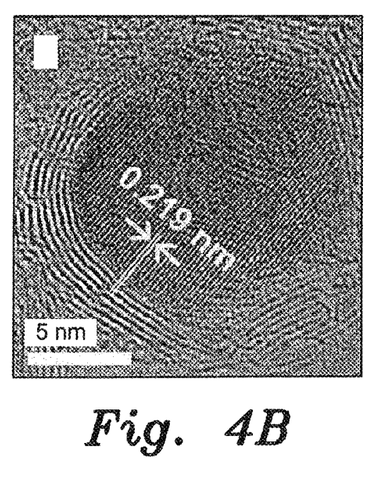
Figure 4C:
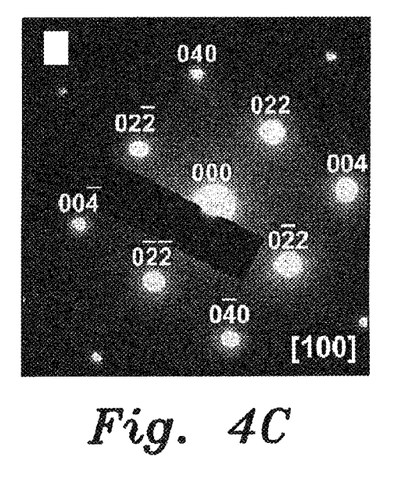

The obtained amorphous phase is no longer maintains its short-range order structure and tends to transform into a different metastable phase of carbon onion phase after 48 h of milling, as shown in FIG. 3C. After 52 h of milling, the HRTEM image elucidates that fine nanoparticles (8-20 nm in diameter) with nearly spherical-like morphology, laid into the "heart" of carbon onion, as shown in FIG. 4A. These fine particles corresponding to nanodiamonds, are evidenced by their interplanar d-spacing (d; 0.219 nm) of a selected particle, which matches well with (100), and the corresponding NBDP as presented in FIGS. 4B and 4C, respectively.

Toward the final stage of ball milling (65 h), all of the carbon onions disappeared and transformed into nanodiamond phase, indicated by the broad Bragg peaks of (111), (002) and (220) related to nanodiamonds shown in FIG. 1 (graph D).

Figure 5A:
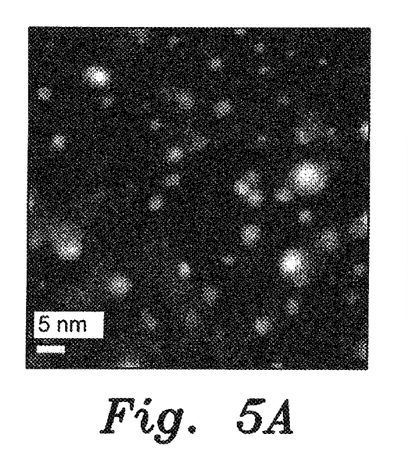
FIG. 5A shows the DFI-STEM of graphite powders obtained after 65 h of ball milling time.
Figure 5B:
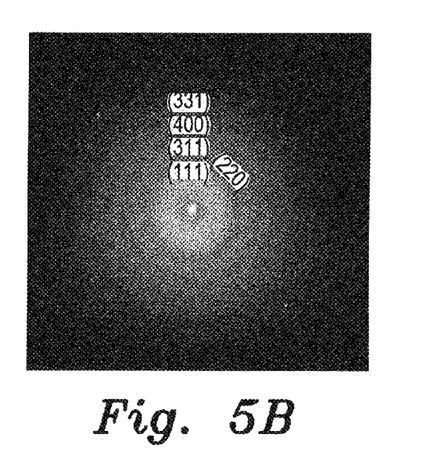
FIG. 5B shows Fast Fourier Transform (FFT) of graphite powders obtained after 65 h of ball milling time.

These obtained nanodiamonds have spherical like morphology with particle size distribution ranging between 2-7 nm in diameter, as shown in FIG. 5A. Moreover, the selected area diffraction pattern (SADP) shown in FIG. 5B, taken from a bright field image (BFI) of the powders, presents continuous Debye-ring diffraction patterns related to diamond structure.

Figure 5C:
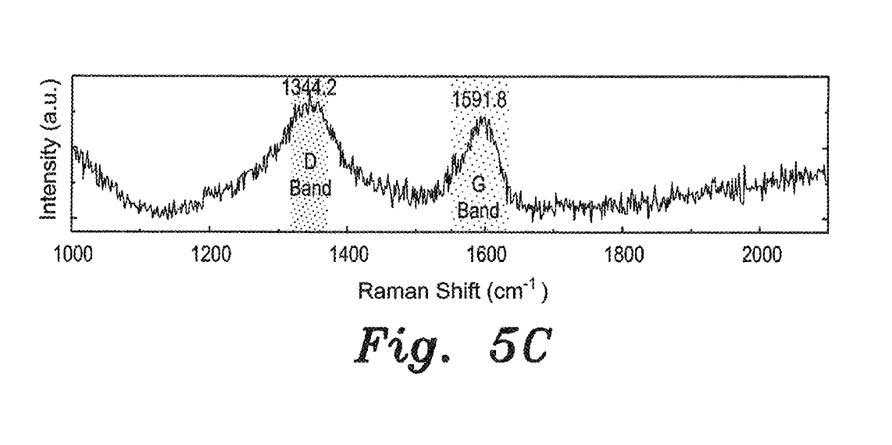
FIG. 5C shows raman spectrum after 65 h of ball milling time (the Raman spectrum was recorded excitation by an ultraviolet laser (325 nm)).

For the purposes of the present invention and in part to investigate the phase transformations performed in graphite powders using a high energy ball mill more clearly, Raman spectroscopy was employed. The Raman spectrum of the nanodiamonds obtained after 65 h of ball milling is shown in FIG. 5C. The powders reveal two features as follows laid at 1344.2 $cm^{-1}$ and 1591.8 $cm^{-1}$ as displayed in FIG. 5C. The first peak corresponds to diamond peak, known as "D-band." The second peak relates to $sp^2$ containing graphite "G-band".

Figure 6A:
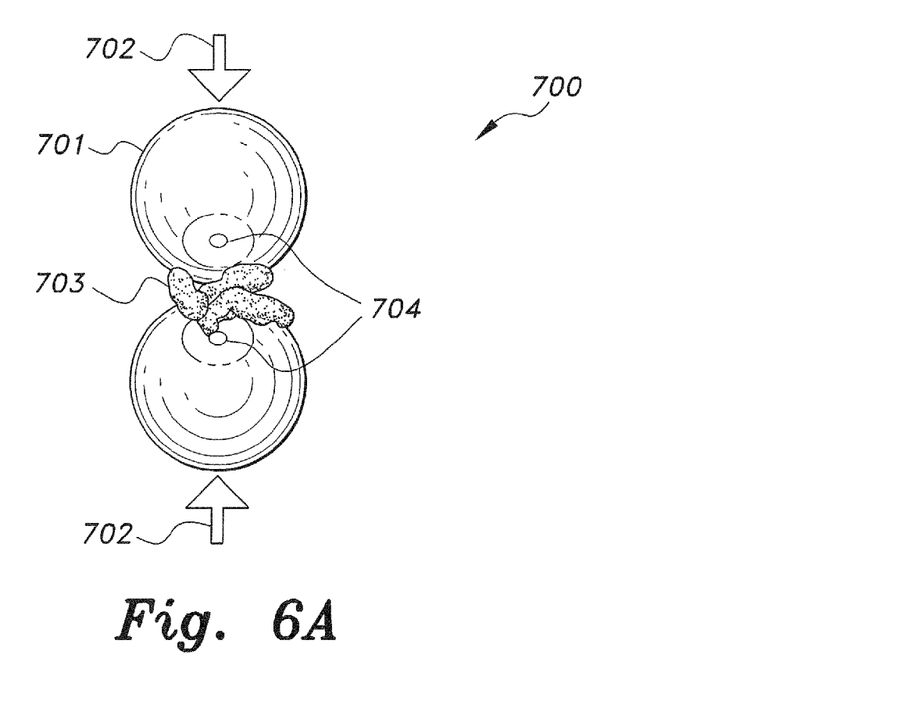
FIG. 6A shows a schematic illustration of the ball powder ball collision taking place during high energy ball milling of elemental graphite powder according to the present method.

The present synthetic method confirms that high-energy ball milling of elemental graphite powders generated severe stresses that affected the milled powders during the different stages of milling. These stresses were generated by the ball-powder-ball collisions as shown diagrammatically in FIG. 6A, which destabilizes the graphite powders into a less stable phase. For example, as shown in FIG. 6A, when at least two balls 701 impact graphite powder 703 at collision points 704 with opposing directions of impact force 702, the graphite powders are destabilized.

Figure 6B:
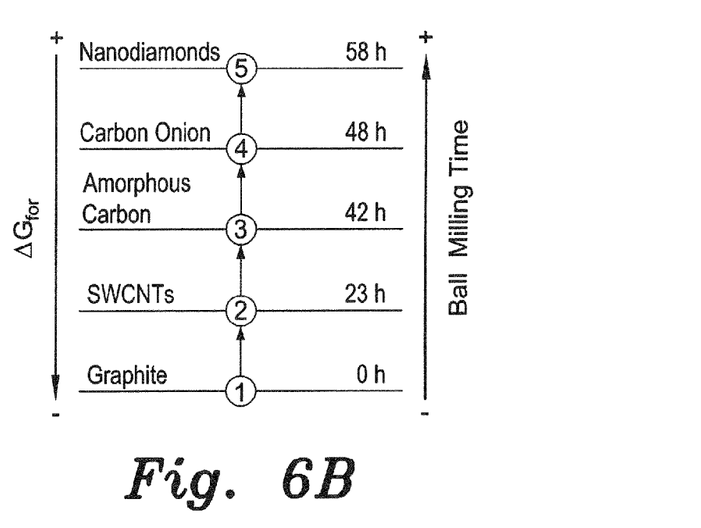
FIG. 6B shows the expected changes in free energy of formation leading from graphite to nanodiamonds phase transition.

Since graphite is the most stable phase in the carbon family, the graphite SWCNTs phase transformation resulting from ball milling corresponds to the potential energy (E) supplied by the balls as shown in FIG. 6B to raise the free energy of formation for graphite $\Delta G_{for}$ from point 1 to point 2. After 42 h of milling time, a SWCNTs-amorphous carbon phase transformation can be achieved. Accordingly, the free energy of formation, $\Delta G_{for}$, is raised again from point 2 to point 3 (FIG. 6B) suggesting continuity of destabilization process. It is hypothesized that the reason for this state is the high energy input transferred to the SWCNTs. The obtained amorphous phase is no longer maintained in its short-range order structure and tends to transform into a different metastable phase (point 4 in FIG. 6B) of carbon onion after 48 h of milling. Increasing the ball milling time (58 h) raised free energy again, corresponding to the formation of nanodiamonds, as presented in FIG. 6B.

It is to be understood that the present invention is not limited to the embodiments described above, but encompasses any and all embodiments within the scope of the following claims.

I claim:

1. A method for synthesizing nanodiamonds, consisting of:
   disposing graphite powder in a ball milling container, the ball milling container including a plurality of milling balls and having an inert atmosphere therein;
   disposing the ball milling container including the graphite powder in a ball mill; operating the ball mill for a first period of time to achieve high-energy collision of the plurality of balls with the graphite powder in the container, the high energy collision occurring in the first period of time producing a first product powder including nanodiamonds, wherein the high energy collision occurs at ambient pressure and room temperature;
   disposing the first product powder in a high-pressure ball milling container; pressurizing the high-pressure ball milling container with $H_2$ gas wherein the high-pressure ball milling container is pressurized to a pressure of about 50 bar; disposing the ball milling container including the first product powder in the ball mill; and operating the ball mill for a second period of time to achieve high-energy collision of the plurality of balls with the first product powder in the container, the high energy collision occurring in the second period of time producing a second product powder.

2. The method for synthesizing nanodiamonds according to claim 1, wherein the ball mill is operated at rotation speed of at least 300 rotations per minute and the first period of time is at least 52 hours.

3. The method for synthesizing nanodiamonds according to claim 2, wherein the ball mill is operated at rotation speed of about 400 rotations per minute and the first period of time is about 58 hours.

4. The method for synthesizing nanodiamonds according to claim 1, wherein the nanodiamonds in the second product powder have a particle size of about 2 to about 7 nm in diameter.

5. The method for synthesizing nanodiamonds according to claim 1, wherein a ball to graphite powder weight ratio in the ball mill container is about 40:1.

6. The method for synthesizing nanodiamonds according to claim 1, wherein the ball milling container is a vial formed from an alloy of chromium and stainless steel.

7. The method for synthesizing nanodiamonds according to claim 1, wherein the plurality of milling balls include chromium steel alloy.

8. The method for synthesizing nanodiamonds according to claim 7, wherein the plurality of milling balls include a plurality of balls having a first size and a plurality of balls having a second size, the first size being different from the second size.

9. The method for synthesizing nanodiamonds according to claim 8, wherein the first sized balls are about 19 mm in diameter and the second sized ball are about 14 mm in diameter.

10. The method for synthesizing nanodiamonds according to claim 1, wherein the second period of time is less than the first period of time.

11. The method for synthesizing nanodiamonds according to claim 10, wherein the second period of time is about seven hours.

12. The method for synthesizing nanodiamonds according to claim 1, wherein the nanodiamonds in the second product powder have a spherical morphology.

13. The method for synthesizing nanodiamonds according to claim 1, wherein the second product powder includes a greater amount of nanodiamonds than the first product powder.

* * * * *